United States Patent
Chen et al.

(10) Patent No.: US 9,470,058 B2
(45) Date of Patent: Oct. 18, 2016

(54) ULTRA HIGH TEMPERATURE PACKER BY HIGH-TEMPERATURE ELASTOMERIC POLYMERS

(75) Inventors: Kuo-Chiang Chen, Sugar Land, TX (US); Agathe Robisson, Cambridge, MA (US); Huilin Tu, Belmont, MA (US); Partha Ganguly, Woburn, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 620 days.

(21) Appl. No.: 12/635,087

(22) Filed: Dec. 10, 2009

(65) Prior Publication Data

US 2011/0139466 A1   Jun. 16, 2011

(51) Int. Cl.
- *E21B 33/12* (2006.01)
- *C08G 65/48* (2006.01)
- *C08L 71/00* (2006.01)

(52) U.S. Cl.
CPC ........... *E21B 33/1208* (2013.01); *C08G 65/48* (2013.01); *C08L 71/00* (2013.01); *C08G 2650/40* (2013.01); *C08L 2205/02* (2013.01)

(58) Field of Classification Search
None
See application file for complete search history.

(56) References Cited

U.S. PATENT DOCUMENTS

| | | | |
|---|---|---|---|
| 2,659,712 A * | 11/1953 | Thompson et al. | 528/228 |
| 4,588,029 A | 5/1986 | Blizzard | |
| 4,808,699 A | 2/1989 | Van Broekhoven et al. | |
| 4,868,282 A | 9/1989 | Van Broekhoven et al. | |
| 4,986,511 A * | 1/1991 | Irby et al. | 251/1.3 |
| 6,598,672 B2 * | 7/2003 | Bell | E21B 33/1216 166/118 |
| 7,373,991 B2 | 5/2008 | Vaidya | |
| 7,387,170 B2 | 6/2008 | Doane | |
| 7,604,049 B2 | 10/2009 | Vaidya | |
| 7,631,697 B2 | 12/2009 | Bhavsar | |
| 2004/0007829 A1 | 1/2004 | Ross | |
| 2006/0243457 A1 * | 11/2006 | Kossa | E21B 33/1208 166/387 |
| 2006/0270780 A1 * | 11/2006 | Xu et al. | 524/501 |
| 2007/0151727 A1 * | 7/2007 | Tao et al. | 166/250.1 |
| 2007/0240877 A1 | 10/2007 | O'Malley | |
| 2009/0139707 A1 * | 6/2009 | Berzin et al. | 166/118 |
| 2010/0022718 A1 * | 1/2010 | Tu et al. | 525/471 |

OTHER PUBLICATIONS

Thompson et al., "A Novel Method for Crosslinking Polyetheretherketone," 1988, John Wiley & Sons, Inc., Journal of Applied Polymer Sciences, vol. 36, 1113-1120.*

(Continued)

*Primary Examiner* — Angela M DiTrani
(74) *Attorney, Agent, or Firm* — David J. Groesbeck

(57) ABSTRACT

A high temperature downhole packer including a tubular member, an annular and longitudinally movable ring, and a packer. The tubular member has a stop located on an outer diameter thereof. The annular and longitudinally movable ring is disposed around the outer diameter of the tubular member. The packer element is disposed between the stop and the ring. The packer element includes a high temperature elastomeric polymer having a first storage modulus from about 1,000 MPa to about 10,000 MPa at a first temperature between about −100° C. and about 175° C., and a second storage modulus from about 1 MPa to about 1000 MPa at a second temperature ranging from about 175° C. to about 475° C.

7 Claims, 11 Drawing Sheets

(56) References Cited

OTHER PUBLICATIONS

Wu et al., "Effect of Thermal History on Crystallization Behaviour of Polyetheretehrketone by the Dynamic Viscoelastometer," 1988, Huthig & Wepf Verlag, Die Angewandte Makromolekulare Chemie, 164, 103-113.*

PCT/US10/55342, International Preliminary Report on Patentability, dated Jun. 21, 2012, 4 pgs.

* cited by examiner

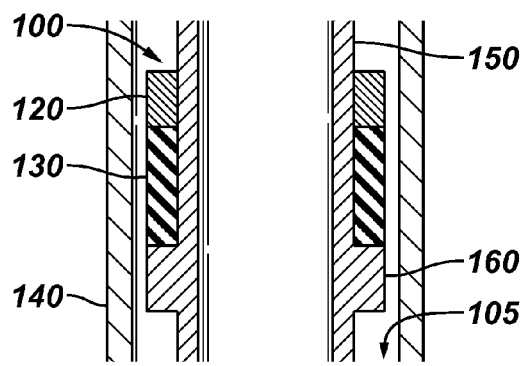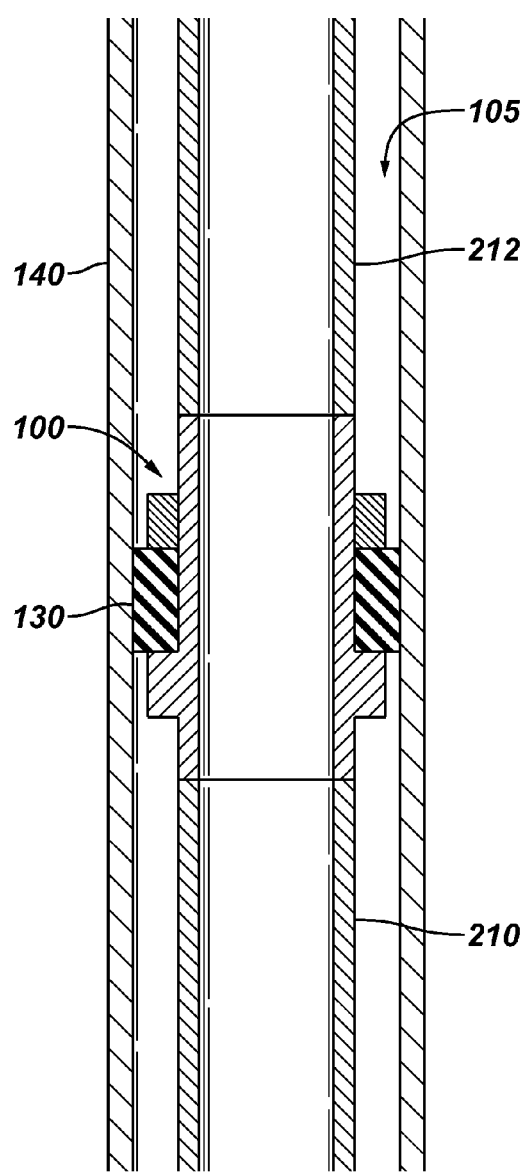

FIG. 5
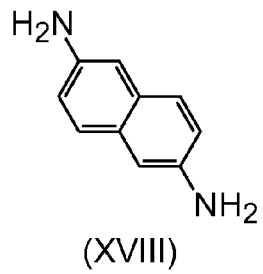
(XVIII)
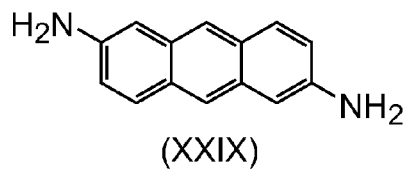
(XXIX)
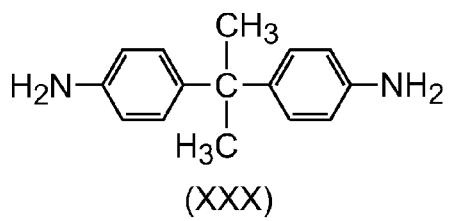
(XXX)
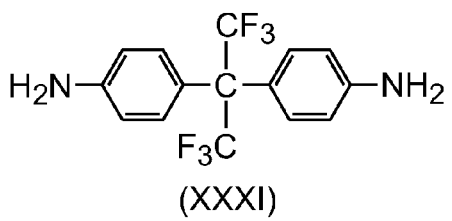
(XXXI)
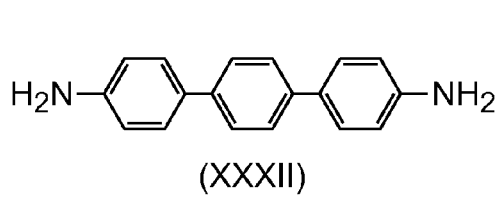
(XXXII)
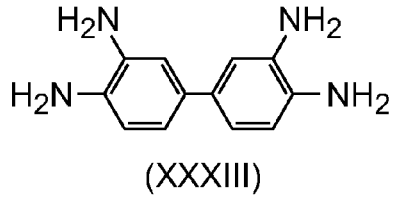
(XXXIII)
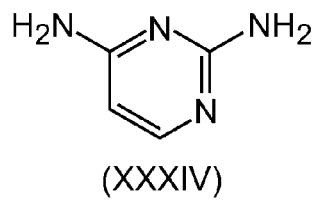
(XXXIV)
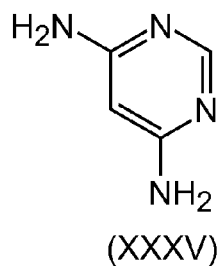
(XXXV)
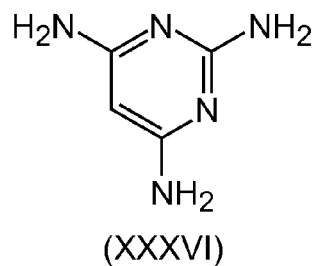
(XXXVI)
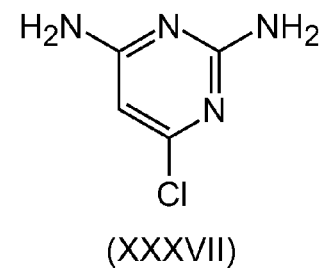
(XXXVII)

FIG. 6
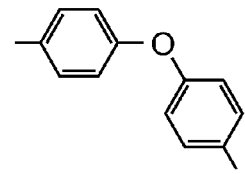
(XXXVIII)
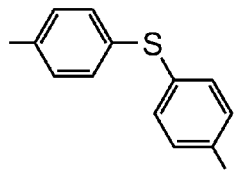
(XXXIX)
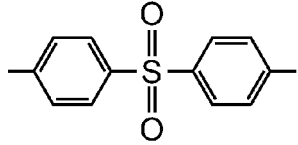
(XXXX)
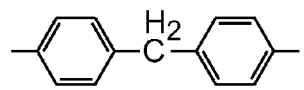
(XXXXI)
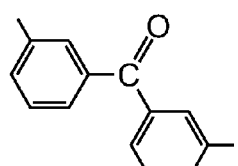
(XXXXII)
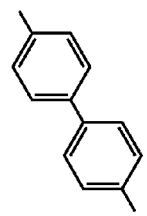
(XXXXIII)
FIG. 7
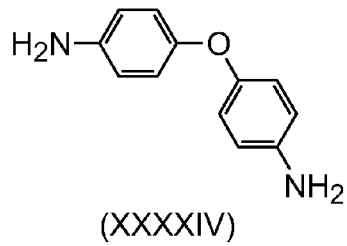
(XXXXIV)
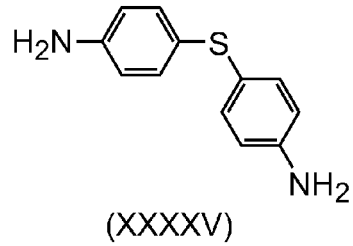
(XXXXV)
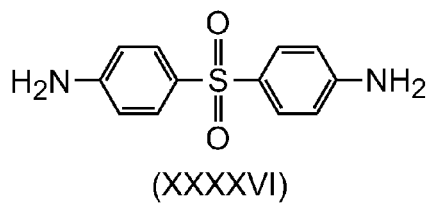
(XXXXVI)
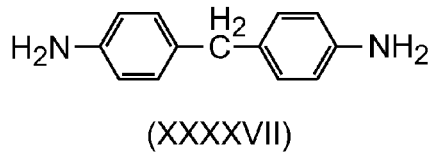
(XXXXVII)
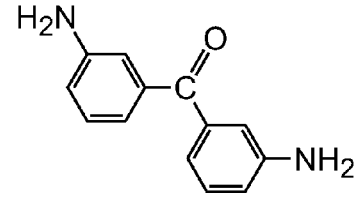
(XXXXVIII)
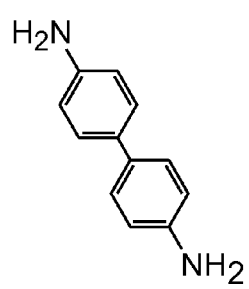
(XXXXIX)

FIG. 8
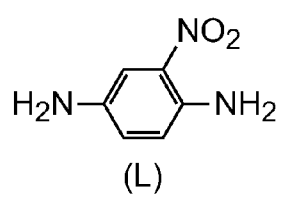
(L)
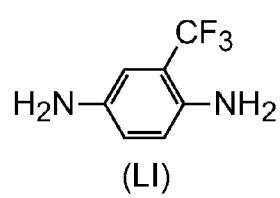
(LI)
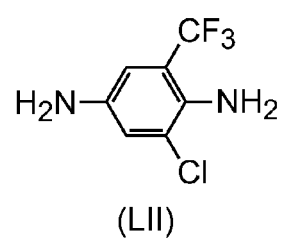
(LII)
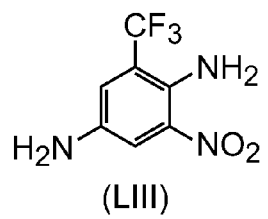
(LIII)
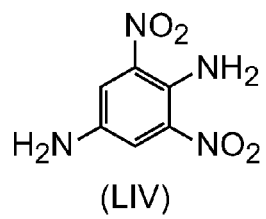
(LIV)
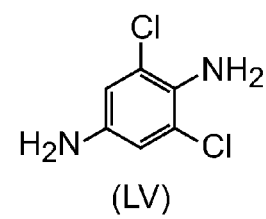
(LV)
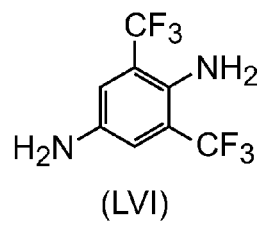
(LVI)
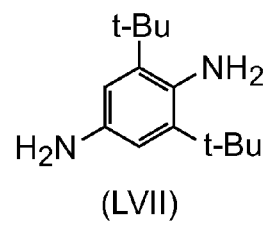
(LVII)

FIG. 9
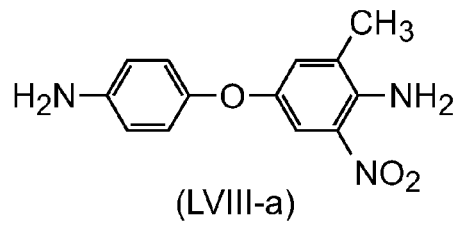
(LVIII-a)
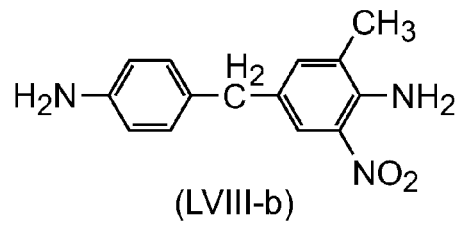
(LVIII-b)
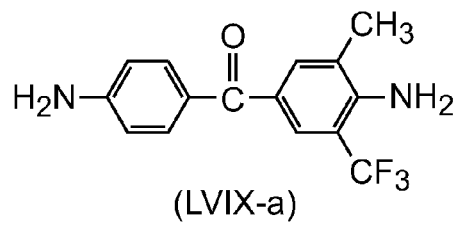
(LVIX-a)
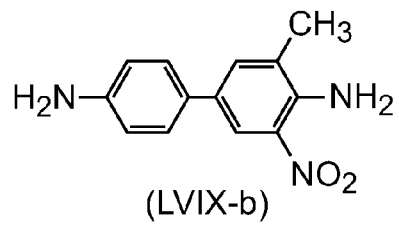
(LVIX-b)
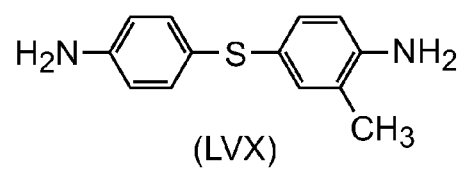
(LVX)
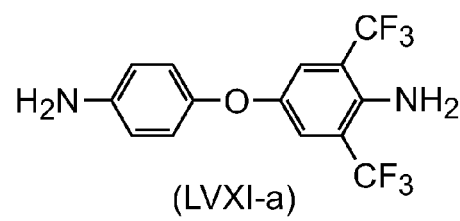
(LVXI-a)
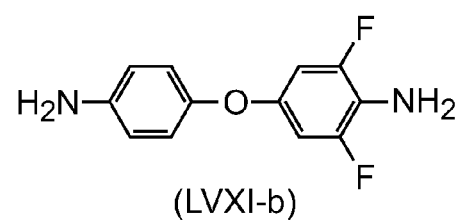
(LVXI-b)
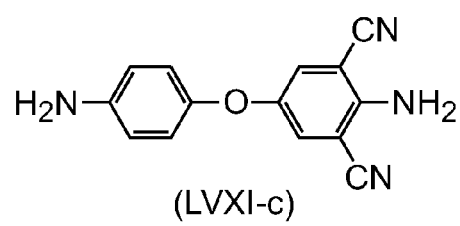
(LVXI-c)
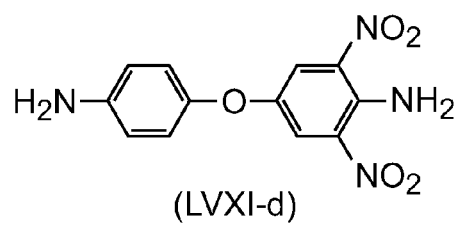
(LVXI-d)
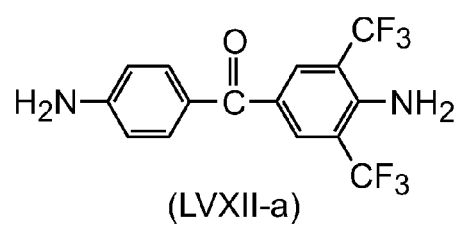
(LVXII-a)
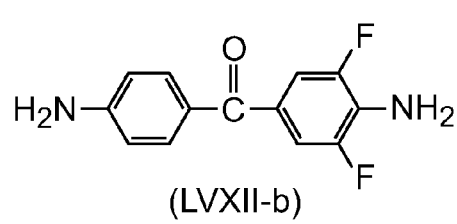
(LVXII-b)
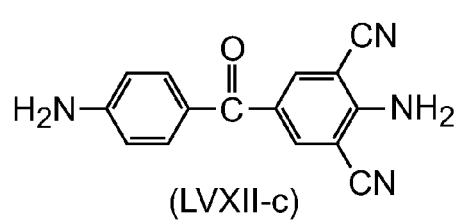
(LVXII-c)
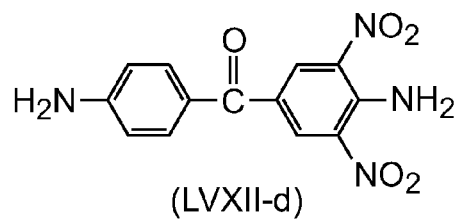
(LVXII-d)

FIG. 10

| STRUCTURE | NAME | MELTING POINT (°C) | BOILING POINT (°C) |
|---|---|---|---|
| $H_2N$—⟨⟩—$NH_2$ | 4,4'-PHENYLENEDIAMINE | 141 | 267 |
| $H_2N$—⟨⟩—O—⟨⟩—$NH_2$ (LVXIII) | 4,4'-DIAMINODIPHENYL ETHER | 189 | >300 |
| $H_2N$—⟨⟩—S—⟨⟩—$NH_2$ (LVXIX) | 4,4'-DIAMINODIPHENYL SULFIDE | 108.5 | >300 |
| $H_2N$—⟨⟩—S(=O)$_2$—⟨⟩—$NH_2$ (LVXX) | 4,4'-DIAMINODIPHENYL SULFONE | 175.5 | >300 |
| $H_2N$—⟨⟩—$CH_2$—⟨⟩—$NH_2$ (LVXXI) | 4,4'-DIAMINODIPHENYL METHANE | 92.5 | 398 (257 at 18mm Hg) |
| $H_2N$—⟨⟩—C(=O)—⟨⟩—$NH_2$ (LVXXII) | 3,3'-DIAMINOBENZOPHENONE | 173.5 | 285 at 11mm Hg |
| $H_2N$—⟨⟩—⟨⟩—$NH_2$ (LVXXIII) | p-BENZIDINE | 120 | 401 |

ULTRA HIGH TEMPERATURE PACKER BY HIGH-TEMPERATURE ELASTOMERIC POLYMERS

BACKGROUND

In extraction of fuels from a potential fuel producing site, the components used to explore a well-bore and/or extract fuels may be exposed to a broad temperature and/or pressure range. During extraction of fuels from a potential fuel producing site one or more hydrocarbon bearing zones within a wellbore often need to be isolated from other portions of the wellbore. An effective solution for zonal isolation is the use of packers. Packers are often made of elastomeric material. However, significant temperature differences may be experienced by a packer as it is lowered into a well-bore to a desired depth. The wellbore operating temperatures increase as the wellbore gets deeper. Accordingly, as the depth of wellbores increases to facilitate extraction of fuels from deeper hydrocarbon bearing zones and advanced techniques, such as Steam Assisted Gravity Drainage are used, the temperature to which packers are exposed far surpasses the temperatures at which elastomeric materials degrade. Accordingly, traditional packers made of materials that are compliant at and/or near room temperature may be unable to operate at temperatures in the deep wells.

There is a need, therefore, for a high temperature elastomeric seal element for use with a packer that does not degrade, but is sufficiently compliant to form a viable seal, in high temperatures.

SUMMARY

Embodiments of the disclosure may provide an exemplary downhole packer for use in a wellbore. The exemplary downhole packer includes a tubular member, a ring, and a seal element. The tubular member has a stop rigidly attached to an outer diameter thereof. The ring is movably positioned on the outer diameter of the tubular member. The seal element is circumferentially positioned around the tubular member between the stop and the ring, and includes a high temperature elastomeric polymer having a plurality of polyetheretherketone chains. At least a first and a second polyetheretherketone chain are cross-linked to each other through an N—$R_X$—N group, wherein one nitrogen group of the N—$R_X$—N group is bound to a carbon of the first polyetheretherketone chain through a first carbon-nitrogen double bond, and another nitrogen of the N—$R_X$—N group is bound to a carbon of the second polyetheretherketone chain through a second carbon-nitrogen double bond, and wherein the N—$R_X$—N group is provided from a cross-linker having one of formulae (II)-(V).

Embodiments of the disclosure may also provide an exemplary method of sealing an annulus of a wellbore. The exemplary method includes conveying a downhole packer into a wellbore at a temperature less than or equal to a first temperature. The downhole packer includes a tubular member having a ring slidably positioned on an outer surface thereof, a stop fixedly attached to the outer surface, and an annular seal element mounted around the tubular member between the stop and the ring. The annular seal element includes a high temperature elastomeric polymer having a first storage modulus at the first temperature and a second storage modulus at a second temperature. The exemplary method also includes exposing the annular seal element to a wellbore temperature greater than or equal to the second temperature, and setting the annular seal element.

Embodiments of the disclosure may further provide an exemplary high temperature downhole packer including a tubular member, an annular and longitudinally movable ring, and a packer. The tubular member has a stop located on an outer diameter thereof. The annular and longitudinally movable ring is disposed around the outer diameter of the tubular member. The packer element is disposed between the stop and the ring. The packer element includes a high temperature elastomeric polymer having a first storage modulus from about 1,000 MPa to about 10,000 MPa at a first temperature between about −100° C. and about 175° C., and a second storage modulus from about 1 MPa to about 1000 MPa at a second temperature ranging from about 175° C. to about 475° C.

BRIEF DESCRIPTION OF THE DRAWINGS

So that the recited features of the invention can be understood in detail, a more particular description of the invention may be had by reference to one or more of the following exemplary embodiments, some of which are illustrated in the appended drawings. It is to be noted, however, that the appended drawings illustrate only exemplary embodiments and are therefore not to be considered limiting of the scope of the invention, for the invention may admit to other equally effective embodiments.

FIG. 1 depicts a cross-sectional view of an illustrative downhole packer located within in a wellbore in an unset configuration, according to one or more embodiments described.

FIG. 2 depicts a cross-sectional view of the downhole packer of FIG. 1 connected between two tubular members and set within the wellbore depicted in FIG. 1, according to one or more embodiments described.

FIG. 5 shows illustrative cross-linkers that may be used to provide a cross-linked polymer, according to one or more embodiments described.

FIG. 6 shows illustrative groups that may be used in the generic polymer formulae provided herein, according to one or more embodiments described.

FIG. 7 shows illustrative cross-linkers that may be used to provide a cross-linked polymer, according to one or more embodiments described.

FIG. 8 shows various cross-linkers including asymmetric cross-linkers, according to one or more embodiments described.

FIG. 9 shows various cross-linkers that may be used to provide a cross-linked polymer according to one or more embodiments described.

FIG. 10 includes Table I, which lists illustrative cross-linkers and their melting and boiling points, according to one or more embodiments described.

DETAILED DESCRIPTION

Figure 3:
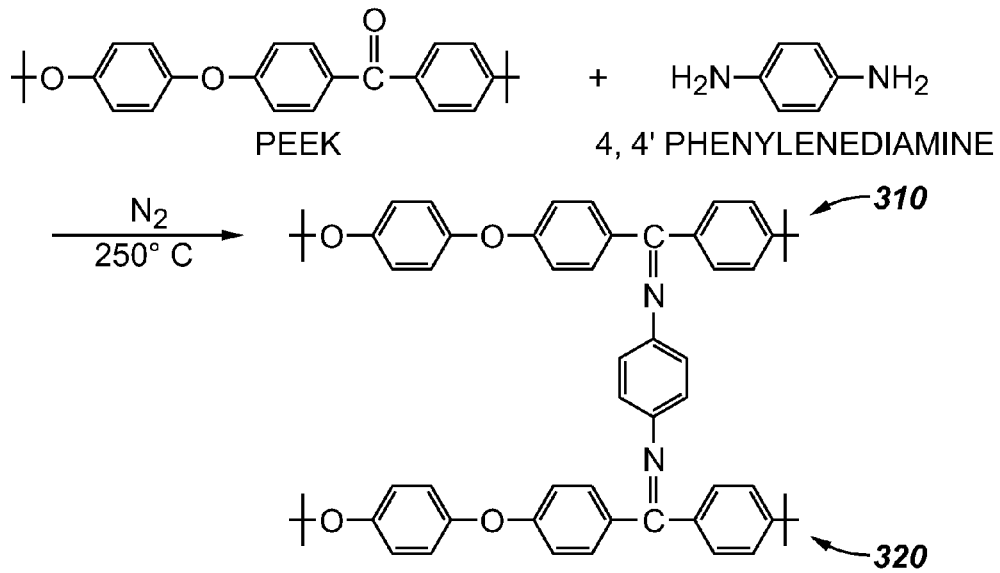
FIG. 3 is a general reaction scheme of a polyetheretherketone with 4,4'-phenylene diamine, according to one or more embodiments described.

FIG. 1 depicts a cross-sectional view of an exemplary embodiment of a downhole packer 100 in an unset configuration. The packer 100 can include a tubular member 150 having one or more stops 160 and one or more rings 120 disposed thereabout. A seal element 130 can be disposed about the tubular member 150 between the stop 160 and the ring 120. The packer 100 can be used in a wellbore 105. The wellbore 105 can be a horizontal, vertical, or deviated.

The tubular member 150 can be any downhole tubular member. For example, the tubular member 150 can be a blank pipe. The tubular member 150 can be configured to connect to other tubular members. For example, both ends of the tubular member 150 can be configured to threadably connect or otherwise secure to one or more portions of a downhole completion. The downhole completion can be a sand control, a treatment, and/or a production completion.

The stop 160 can be formed into the tubular member 150 or the stop 160 can be secured about the tubular member 150. For example, the stop 160 can be a portion of the tubular member 150 having a larger outer diameter than the other portions of the tubular member 150. The stop 160 can also be a collar, a ring, a sleeve, flange, or the like welded or otherwise secured to the tubular member 150. The stop 160 prevents the seal element 130 from moving longitudinally along the outer surface of the tubular member 150 past the stop 160 when the ring 120 is moved towards the stop 160.

The ring 120, which is generally manufactured from a rigid material such as a metal or a metal alloy, can be movably disposed about the tubular member 150. The ring 120 can apply a compressive force to the seal element when the ring 120 is moved towards the stop 160. The ring 120 can be a sleeve, a tubular member, a c-ring, or the like.

The seal element 130 can be any high temperature elastomeric polymer. The seal element 130 can have a first storage modulus from about 2,000 MPa to about 10,000 MPa at a first temperature between about −100° C. and about 175° C. The seal element 130 can have a second storage modulus of between about 10 MPa and about 5,000 MPa at a second temperature between about 150° C. and about 450° C. The seal element 130 can be destroyed at a temperature of about 485° C. to about 500° C. It will be appreciated, however, that the seal element 130 can experience a slow rate of degradation at temperatures at or near, for example, about 400° C., which may be above the operating temperature of the seal element 130, as described in more detail below. The seal element 130 can be or include any high temperature elastomeric polymer. Illustrative high temperature elastomeric polymers are described in more detail below. The seal element 130 can be rigid, that is, too stiff to compliantly deform when first conveyed into the wellbore 105 at a temperature less than or equal to the first temperature. The seal element 130 can compliantly deform when exposed to a wellbore temperature equal to or greater than the second temperature.

FIG. 2 depicts a cross-sectional view of the downhole packer 100 of FIG. 1 in a set configuration, according to one or more embodiments of the invention. The packer 100 can be connected between tubular members 210, 212. The second tubular member 210 can be part of a sand control completion, a treatment completion, and/or a production completion.

In operation, the packer 100 and the second tubular member 210 can be conveyed into a wellbore 105 and the seal element 130 can be less than or equal to the first temperature when introduced into the wellbore. The wellbore 105 can be an openhole wellbore or a cased wellbore. The wellbore 105 can have a casing 140 disposed therein when the wellbore 105 is a cased wellbore. The seal element 130 can be exposed to a temperature greater than or equal to the second temperature as the packer 100 and second tubular member 210 are conveyed into the wellbore 105. The storage modulus of the seal element 130 can reduce as the seal element 130 is exposed to a temperature greater than or equal to the second temperature.

The seal element 130 can be compressed when the packer 100 and the second tubular member 210 are properly located within the wellbore 105 and the seal element 130 is at a temperature greater than or equal to the second temperature. The proper location within the wellbore 130 can be any location within the wellbore 105. For example, the packer 100 and the second tubular member 210 can be properly located when at least a portion of the second tubular member 210 is located adjacent a hydrocarbon producing zone (not shown). The seal element 130 is compressed by moving the ring 120 towards the stop 160. The ring 120 can be moved towards the stop 160 by force applied to the ring 120 by a third tubular member. The third tubular member can be an "upper" completion and/or drill pipe, for example. The seal element 130 can expand in the radial direction. The radial direction is the direction perpendicular to the central axis of the wellbore 105. The seal element 130 can engage or contact the inner surface of the casing 140 when fully expanded. The seal element 130 can at least partially isolate a portion of the wellbore 105 from at least another portion of the wellbore 105 when engaged with the casing 140.

FIG. 3 is a general reaction scheme of a polyetheretherketone with 4,4'-phenylene diamine, according to one or more embodiments. The high temperature elastomeric polymer can be a polymer including a general formula of $(P_1)_m—X—(P_2)_n$. In certain examples, $P_1$ represents a first polymer chain, $P_2$ represents a second polymer chain, and the two chains are cross-linked through the X group 315, which is provided from one or more of the illustrative cross-linkers described herein. The cross-linker X typically includes at least two amino groups, which can react with the polymer chains to provide two or more Schiff base linkages between the polymer chains. For example, where the polymeric chains are both a polyketone, the resulting polymer may have a general formula as shown in formula (I) below.

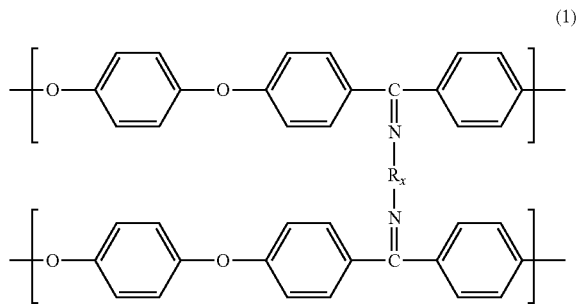

(1)

In formula (I), N—$R_X$—N represents the X group of the generic formula $(P_1)_m$—X—$(P_2)_n$ and RX is variable as discussed further below. In the example shown in formula (I), each of $P_1$ and $P_2$ has been selected to be polyetheretherketone (PEEK), though other polymers may be used as well. The number of repeating monomeric units of each polymer chain is defined by m and n. In certain examples, m and n may be the same or may be different and, on average, each of m and n may be from 10 to about 1000.

As shown in formula (I), certain embodiments of the cross-linkers disclosed herein are effective to cross-link polymeric chains, such as polyetheretherketone chains, through one or more Schiff base linkages. A Schiff base, also referred to as a substituted imine, is characterized by having at least one carbon-nitrogen double bond with the nitrogen connected to alkyl, aryl or other non-hydrogen substituents. Schiff bases are generally produced by reacting an amino group, typically an amino group of an aromatic amine, with a carbonyl compound. The amine adds to the carbonyl group in a first step, and dehydration through loss of an amine bound proton and addition of a hydrogen to the oxygen results in the formation of the carbon-nitrogen double bond. In some examples, the diamino cross-linkers disclosed herein provide at least two Schiff base linkages after reaction with a polymer. An illustrative reaction to provide a Schiff base linkage is shown in FIG. 3. In this reaction scheme, polyetheretherketone reacts with 4,4'-phenylenediamine in an inert nitrogen atmosphere at 250° C. to provide two Schiff base linkages, one between a first PEEK chain 310 and one between a second PEEK chain 320. These Schiff base linkages join various PEEK chains together resulting in polymerization.

In certain embodiments, many different types of polymers may be used with the cross-linkers disclosed herein. For example, a polyester, a polyether, a polyarylene and the like may be used with the cross-linkers disclosed herein. In some examples, aromatic polymers such as, for example, poly (arylene oxide) (PPO), poly(arylene sulfide) (PPS), poly (arylene ether ketone) (PEK), poly(arylene ether sulfone) (PES), poly(benzazole) (PBX) type of rigid-rod polymers including poly(benzimidazole) (PBI), poly(benzoxazole) (PBO) and poly(benzothiazole) (PBT), poly(diimidazo pyridinylene dihydroxy phenylene) (PIPD, i.e. M5), poly(p-phenylene terephthalamide) (PPTA, i.e. KEVLAR™), and thermotropic liquid crystalline polyesters may be used. Additional suitable polymers will be readily selected by the person of ordinary skill in the art, given the benefit of this disclosure.

In one or more embodiments, the resulting high temperature elastomeric polymer may have a number average molecular weight (Mn) of from about 3,000 Daltons to about 1,200,000 Daltons, as determined by gel permeation chromatography. For example, the number average molecular weight of the resulting high temperature elastomeric polymer can range from about 3,000 Daltons to about 300,000 Daltons. The high temperature elastomeric polymer can also have a weight average molecular weight (Mw) of from about 3,000 Daltons to about 600,000 Daltons, or from about 3,000 Daltons to about 300,000 Daltons.

It will be recognized by the person of ordinary skill in the art, given the benefit of this disclosure, that the illustrative number average and weight average molecular weights described above are provided merely for illustration. High temperature elastomeric polymers having molecular weight ranges below or above these illustrative ranges may also be suitable for use with the cross-linkers disclosed herein.

In some examples, a desired viscosity may be selected and determined, for example, using m-cresol at 60° C. in a standard capillary viscosity measuring device. If solubility is an issue, then other solvents including, but not limited to, diphenylsulfone, m-terphenyl, pyrene, fluoranthene, and strong acids including sulfuric acid at around room temperature may be used to dissolve PEEK and/or determine the viscosity. Such dissolution and/or viscosity determination may be performed from about room temperature up to, for example, high temperatures such as those greater than or equal to 200° C.

In certain embodiments, the cross-linkers disclosed may be used to provide a pre-polymer that includes one or more cross-linkers as discussed herein along with a polymer. Certain embodiments of a polymer generally includes a linear alternating aliphatic backbone structure and includes approximately one molecule of carbon monoxide (on average) for each molecule of ethylenically unsaturated hydrocarbon. In addition, the polymer chain may include side chain functionalities such as, for example, aryl groups. In addition, or in the alternative, to those polymers listed herein, particularly suited polymers for use with the cross-linkers described herein include, but are not limited to, those which are copolymers of carbon monoxide and ethylene or terpolymers of carbon monoxide, ethylene and a second ethylenically unsaturated hydrocarbon of three or more carbon atoms such as, for example, an alpha-olefin such as propylene.

In certain examples, one desirable class of polymers includes polyketone polymers and polymers that include two or more ketone groups. Illustrative methods for producing polyketones are described, for example, in U.S. Pat. Nos. 4,808,699 and 4,868,282, the entirety of both being incorporated herein by reference to the extent not inconsistent with this disclosure. In addition, there are many commercially available polyketone polymers suitable for use with the cross-linkers disclosed herein. In some examples, the polyketone polymer may be polyetheretherketone (PEEK). PEEK is a high performance thermoplastic semi-crystalline polymer with high glass transition and melting temperatures ($T_g$=143° C. and $T_m$=334° C.). The scientific name of PEEK is poly(oxy-1,4-phenylene-oxy-1,4-phenylecarbonyl-1,4-phenylene). PEEK has excellent temperature resistance, mechanical properties, and chemical resistance. It is melt processable, and reinforcement of PEEK with fibers or particulate fillers improves properties substantially. PEEK and composite materials based on PEEK are widely used in electrical, automotive, aerospace, oil and gas, and chemical industries. Specifically, the main applications of PEEK in oil and gas industry include electrical cables and insulations, valves, pumps and seals. PEEK may be obtained commercially from numerous sources including, for example, VICTREX™ (West Conshohocken, Pa.), Solvay (Alpharetta, Ga.) and other suppliers.

As a thermoplastic, PEEK material may creep under excessive mechanical load, especially under high temperatures. Introducing cross-links to PEEK materials using one or more of the cross-linkers disclosed herein is an effective method to overcome creeping problem. Methods to cross-link PEEK include ion or electron beam irradiation, elemental sulfur as a cross-linker, and diamine as a cross-linker to crosslink PEEK. In certain embodiments, aromatic diamines or multiamines may be used as cross-linkers because they provide an excellent balance of control over the cross-linking reaction and thermal stability of the cross-linked product.

1,4-Phenylene diamine has been reported to react with carbonyl groups in PEEK and crosslink it via aromatic imines, i.e. Schiff bases (FIG. 3). As discussed above, Schiff bases form short, stiff linkages between PEEK chains. The cross-linked PEEK maintains excellent thermal resistance and provides a high temperature elastomeric polymer. The material stiffness becomes less sensitive to temperature after cross-linking. A higher $T_g$ is also observed. Schiff base is susceptible to hydrolysis, especially in acidic or basic fluid and at high temperatures. This affects the long-term durability of the cross-linked PEEK in an oilfield environment.

In some embodiments, a diamine having a boiling point of 300° C. or more may be used as a cross-linker. In other embodiments, a symmetric or asymmetric diamine, such as the illustrative small molecule diamines described herein, optionally having a boiling point of 300° C. or more, may be used as a cross-linker. In additional embodiments, a substituted or unsubstituted diamine, optionally having a boiling point of 300° C. or more, may be used as a cross-linker. These cross-linkers may be used alone or may be combined with one or more other cross-linkers to provide different types of cross-linking between polymer chains. Illustrative cross-linkers are described herein and shown, for example, in FIGS. 5, 7 and 8. In addition, the boiling points for selected cross-linkers are shown in FIG. 10.

In certain examples, the illustrative cross-linkers described herein may be classified, for convenience purposes only, based on the particular group or groups selected for the X group of the generic $(P_1)_m$—X—$(P_2)_n$ formula. For example, the cross-linkers may be classified into three general categories: (1) a small molecule diamine; (2) a polymeric diamine; or (3) a derivatized structural reinforcing component such as, for example, a derivatized fiber or particle that includes one or more amino groups. Certain examples of each of these illustrative categories of cross-linkers are described in more detail below. While these cross-linkers are referred to in certain instances as diamines, the cross-linkers may also include additional amino groups to provide triamines, tetraamines and other compounds having two or more amino groups. Polymers produced using the illustrative cross-linkers disclosed below may be generally depicted as shown in formula (I) (though the exact composition of the polymer chains may vary) with the amino groups of the polymers forming the Schiff base linkages and the remainder of the cross-linkers being positioned between the amino groups involved in Schiff base formation.

Figure 4:
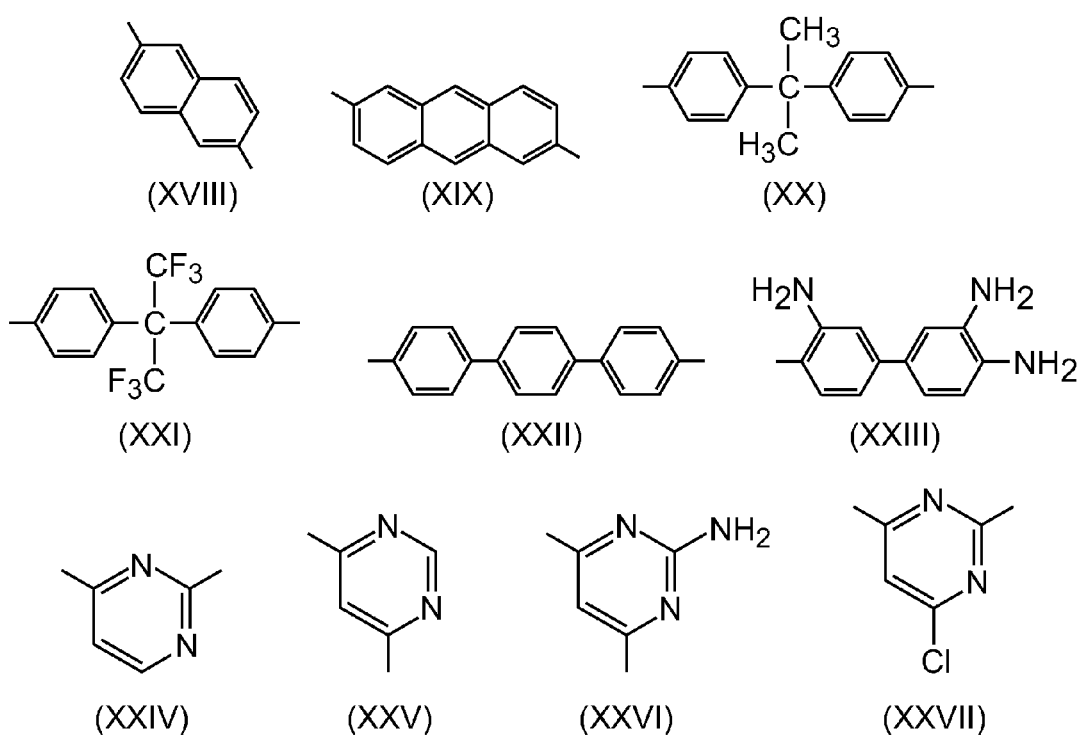
FIG. 4 shows illustrative groups that may be used in the generic polymer formulae provided herein, according to one or more embodiments described.

FIG. 4 shows illustrative groups that may be used in the generic polymer formula provided herein, according to one or more embodiments. A cross-linker may be selected to provide an $R_X$ group of formula (I) that is one or more of the groups shown. To provide such a group for $R_X$ in the generic formula $(P_1)_m$—N—$R_X$—N—$(P_2)_n$, a small molecule cross-linker may be selected and combined with a polymer to provide such generic formula. For example, in certain embodiments, the cross-linker may be configured as small molecule diamine cross-linker having formula (II).

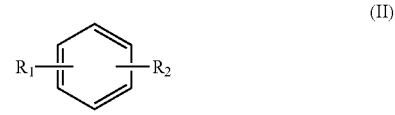

(II)

In some examples, $R_1$ and $R_2$ are each an amine-containing group, whereas in other examples, R1 may be a group other than amine-containing group and $R_2$ comprises at least two amino functionalities to provide a diamine compound. In certain examples, $R_1$ is —$NH_2$ and $R_2$ is selected to provide an aromatic amine containing group. In certain embodiments, $R_1$ and $R_2$ each include an amino-containing group and suitable additional components to provide an aromatic core structure that may be benzyl, naphthyl, anthracenyl, pyridinyl, pyrimidyl, melaminyl, quinolinyl, furanyl, pyrrolyl, oxazolyl, imidazyl, thiophenyl, triazinyl, benzimidazyl and combinations thereof. Illustrative cross-linkers including such core aromatic structures are shown in FIG. 5 as compounds XXVIII-XXXVII. In some examples where each of $R_1$ and $R_2$ are amino groups, the remainder of the positions are hydrogen and each of the polymer chains includes a carbonyl group such as a ketone, to provide a resulting polymer having the general structure shown in FIG. 3.

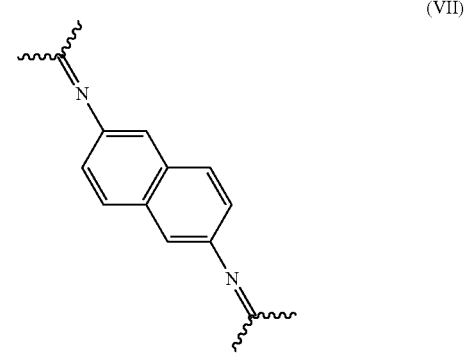

(VII)

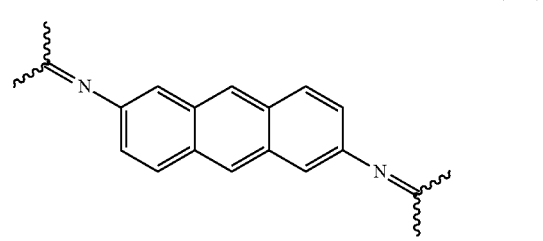

(VIII)

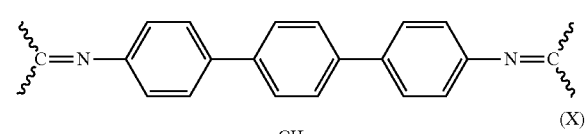

(IX)

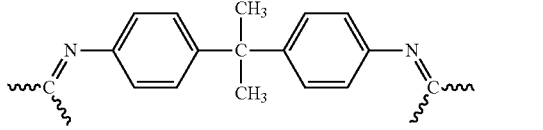

(X)

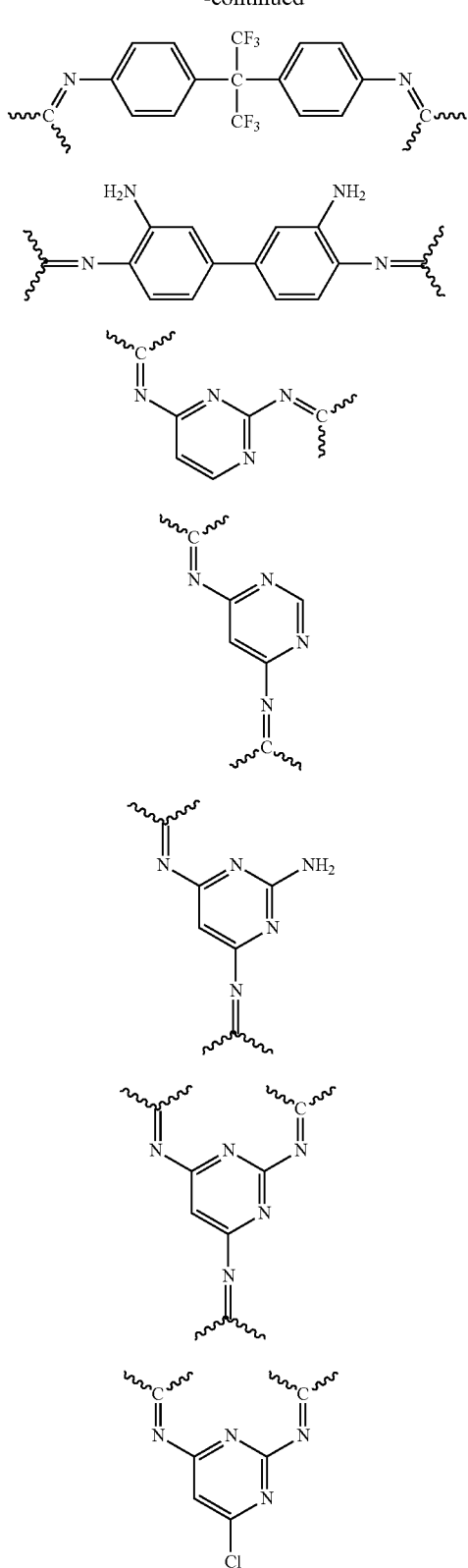

In the polymeric structures shown above, the wavy bonds represent the remainder of the polymer chain, which is omitted for convenience purposes. The resulting high temperature elastomeric polymers provided have RX groups which may be, for example, any of the groups shown in FIG. 4 or other groups that may be provided using small molecule diamine cross-linkers. In addition, those cross-linkers that include more than two amino groups may provide for mixed reaction products, with Schiff base linkage formation provided by different amino groups of the cross-linkers or provided at substantially all free amino groups of the cross-linker.

In certain embodiments, $R_1$ and $R_2$ may be positioned to para- to each other. Para-substituents can provide for more orderly packing of the polymer chains. In other examples, $R_1$ and $R_2$ may be positioned meta- or ortho- to each other. For example, where high crystallinity is not desired, meta- and ortho-cross-linkers may provide cross-linked compounds with suitable properties. In some examples, the remaining positions on the aryl ring of formula (II) may be hydrogen or may be substituted with one or more other groups such as, for example, alkyl groups, hydroxyl groups or other selected groups. In certain examples, the positions of the aryl group which are not $R_1$ or $R_2$ may be, for example, hydrogen, $C_1$-$C_6$ alkyl or may include electron withdrawing groups such as, for example, a halogen, —$NO_2$, —$CF_3$ and the like. In other examples, the positions of the aryl group which are not $R_1$ or $R_2$ may each be hydrogen.

In certain examples, cross-linkers having formula (II) may be selected from those that have a boiling point of 300° C. or more at atmospheric pressure (1 atm). As discussed further below, by selecting cross-linkers whose boiling points are 300° C. or more at atmospheric pressure, the processing temperature may be higher than conventional processing temperatures to provide the high temperature elastomeric polymers having improved properties suitable for use in high temperature and/or high stress environments.

FIG. 6 shows illustrative groups that may be used in the generic polymer formulae provided herein, according to one or more embodiments. A small molecule diamine cross-linker may be selected to provide an $R_X$ group of formula (I) that is one or more of the groups as shown FIG. 6. To provide such a group for $R_X$ in the generic formula $(P_1)_m$—N—$R_X$—N—$(P_2)_n$, a small molecule cross-linker may be selected and combined with a polymer to provide such generic formula. For example, in certain embodiments, the cross-linker may be configured as small molecule diamine cross-linker having formula (III).

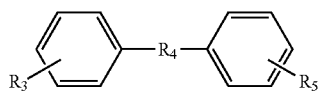 (III)

In certain examples, $R_3$ and $R_5$ may be independently selected such that the compound of formula (III) is a diamine. In some examples, each of $R_3$ and $R_5$ may be —$NH_2$, whereas in other examples $R_3$ may be selected to include at least two amino groups and $R_5$ may be hydrogen, methyl, hydroxyl, methoxy or other non-amino substituents. In certain embodiments, $R_4$ is a bridging group which may or may not be present. That is, in certain embodiments, $R_4$ may be omitted and the two aryl groups may be bound directly to each other or may be fused together to provide a naphthyl based core structure or other higher order structure including two or more fused benzene rings. When $R_4$ is present, $R_4$ may be a carbonyl group, an oxygen atom, a sulfur atom, a sulfonyl group (—S(O)2—), a sulfoxide group (—S(O)—), an alkyl group such as a $C_1$-$C_6$ straight chain (saturated or unsaturated) or branched chain (saturated or unsaturated) group. In embodiments where R4 is an alkyl group, $R_4$ may be, for example, —$CH_2$—, —$CH_2CH_2$—, —$CH_2CH_2CH_2$— or —CH=$CHCH_2$—. Illustrative specific compounds representative of formula (III) are shown in FIG. 6 as compounds XXXVII-XXXXIII. Where each of $R_3$ and $R_5$ are amino groups and each of the polymer chains is PEEK, a resulting polymer having the following structure, for example, may be produced.

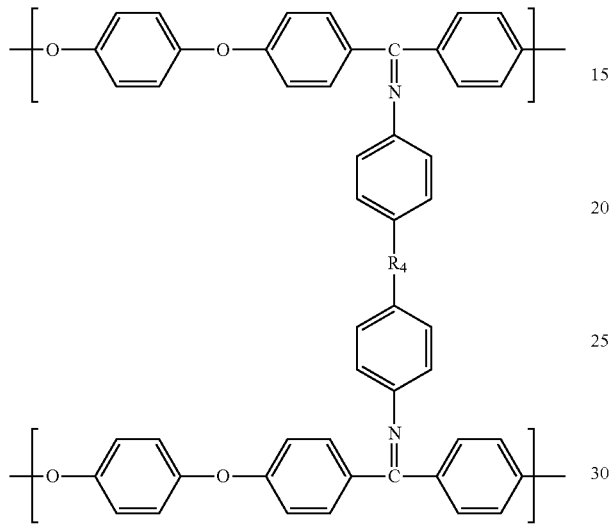

The above structure may vary, depending on the exact position of the $R_3$ and $R_5$ groups on the aryl substituents of formula (III). Similarly, the exact composition may vary depending on the particular group selected for $R_4$ and the particular type of polymer used. Consequently, the above structure is representative of only a single cross-linker within the scope of formula (III), and additional polymeric structures may be produced depending on the exact groups selected for $R_3$, $R_4$, $R_5$ and on the exact type of polymer selected.

In certain examples, cross-linkers having formula (III) may be selected from those that have a boiling point of 300° C. or more at atmospheric pressure (1 atm). As discussed further below, by selecting cross-linkers whose boiling points are 300° C. or more at atmospheric pressure, the processing temperature may be higher than conventional processing temperatures to provide the high temperature elastomeric polymers.

In certain embodiments, the groups of the compounds of formulae (II) and (III) may be selected such that a symmetric aromatic diamine is provided. A symmetric aromatic diamine refers to an aromatic diamine whose amino groups have substantially the same reactivity under similar reaction conditions. The symmetric aromatic diamine may include one or more symmetry axes or planes such as, for example, a $C_2$ plane of symmetry, but the term "symmetrical" unless otherwise clear from the context is intended to refer to the reactivity of the amino groups as being substantially the same.

In other examples, the groups of the compounds of formula (II) and (III) may be selected such that an asymmetric aromatic diamine cross-linker is provided. An asymmetric aromatic diamine includes amino groups having different reactivities under similar reaction conditions. Thus, an asymmetric diamine may also include one or more symmetry planes or axes and still be considered an asymmetric diamine based on the differential reactivities of the amino groups. For example, an asymmetric aromatic diamine may have a formula as shown in formula (IV) below.

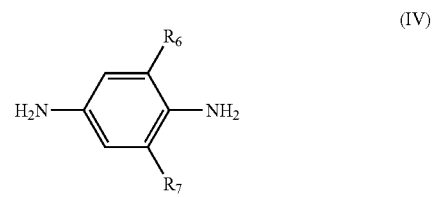

In some examples, $R_6$ and $R_7$ may be the same or may be different. For example, $R_6$ and $R_7$, may independently be selected from a group consisting of hydrogen, —$NO_2$, —$CF_3$, —CN, a halogen, carboxymethyl, alkyl, alkenyl, and alkynyl. Illustrative compounds representative of formula (IV) are shown in FIG. 8 as compounds L-LVII. In at least one particular embodiment, when $R_6$ and $R_7$, are selected to be electron withdrawing groups (for example, $CF_3$, F, CN, $NO_2$, etc.), the amino group between $R_6$ and $R_7$ has a reduced reactivity, as compared with the other amino group, due to the presence of decreased electron density resulting from the presence of the adjacent electron withdrawing groups. As discussed further below, the processing temperature and resulting polymers can be different depending on whether a symmetric aromatic amine or an asymmetric aromatic amine is selected for use. In addition to the electronic differences noted above, the amino group sandwiched by $R_6$ and $R_7$ can have reduced overall reactivity for steric hindrance reasons, as compared to the amino group that is less sterically hindered. The sterically hindered amino group typically requires higher temperatures to promote formation of a Schiff base linkage. As a result of this differential reactivity, premature cross-linking may be reduced or not occur with the use of cross-linkers having a formula (IV).

In other embodiments, the asymmetric aromatic diamine may have a formula similar to the formula shown in formula (III). For example, an asymmetric aromatic diamine may be a compound having formula (V) shown below.

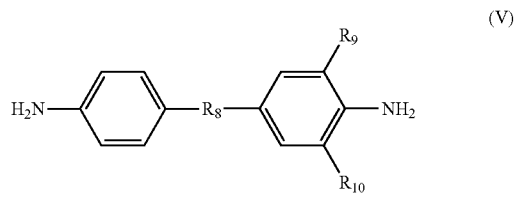

In certain examples, $R_9$ and $R_{10}$ are different such that the overall compound is asymmetric. For example, $R_9$ and $R_{10}$ may independently be selected from the group consisting of hydrogen, —$NO_2$, —$CF_3$, —CN, a halogen, carboxymethyl, alkyl, alkenyl, and alkynyl. In some embodiments, $R_8$ may be absent such that the aryl groups are bonded directly to each other or are fused together to provide a naphthyl or higher ordered fused ring structure. In embodiments where $R_8$ is present, $R_8$ may be a carbonyl group, an oxygen atom, a sulfur atom, a sulfonyl group (—$S(O)_2$—), a sulfoxide group (—S(O)—), an alkyl group such as a $C_1$-$C_6$ straight chain (saturated or unsaturated) or branched chain (saturated or unsaturated) groups. In embodiments where $R_8$ is an alkyl group, $R_8$ may be, for example, —$CH_2$—, —$CH_2CH_2$—, —$CH_2CH_2CH_2$— or —$CH=CHCH_2$—. Illustrative compounds representative of formula (V) are shown in FIG. 9 as compounds LVIII-LVXII.

In certain embodiments where an asymmetric diamine of formula (V) is used, the other positions on the aryl rings may independently be occupied by hydrogen, —$NO_2$, —$CF_3$, —CN, a halogen, carboxymethyl, alkyl, alkenyl, and alkynyl. In some examples, each of the positions on the aryl rings of formula (V) not bound to $R_9$, $R_{10}$ or an amino functionality may be hydrogen.

In certain embodiments, a cross-linker including a derivatized polymer molecule may be used to provide the high temperature elastomeric polymer. In such instances, the derivatized polymer molecule may be used by itself as a cross-linker or combined with one or more other cross-linkers, such as those shown in formulae (II)-(V). Illustrative derivatized polymers include PEEK derivatized with one or more terminal amino groups, as shown in formula (VI).

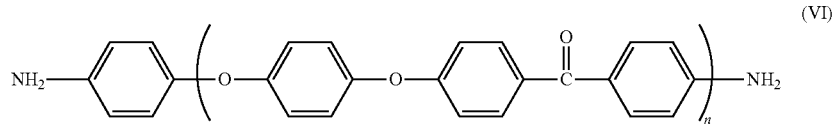

(VI)

In formula (VI), the n value represents the number of monomeric units present in the cross-linker. In certain embodiments, the average value of n may vary from about 10 to about 1000. In some examples it may be desirable to combine the cross-linkers of formula (VI) with PEEK to provide a cross-linked polymer. An advantage of using PEEK with the cross-linkers of formula (VI) is that phase separation is reduced or eliminated, which results in increased mixing of the PEEK molecules and the cross-linkers. Because the backbone of the cross-linkers of formula (VI) is identical to PEEK, the strength of PEEK-cross-linker interactions are almost identical to PEEK-PEEK interactions. When annealing, PEEK molecules may align orderly to form crystalline domains whereas amine end groups of the cross-linkers segregate into the amorphous domains. As a result, the crystallinity of this cross-linked PEEK using the cross-linkers of formula (VI) is expected to be similar to virgin PEEK. In certain examples, PEEK may be derivatized by adding an aminophenol to the PEEK reaction mixture at the final stage of PEEK synthesis.

Figure 11:
FIG. 11 is a schematic of a polymer chain including side chain amino groups, according to one or more embodiments described.

In certain embodiments, a derivatized polymer may include one or more amino groups at or on a side chain of the polymer. For example, while the cross-linker of formula (VI) is shown as including terminal amino groups, these terminal amino groups may be replaced, or may be used with, a cross-linker that includes at least one amino group on a side chain of a monomeric unit of the cross-linker. In some examples, substantially all monomeric units may include at least one side chain amino group, whereas in other examples, selected, but not all, side chains of monomeric units include at least one amino group. A schematic representation of a di-block polymer with side chain amino groups is shown in FIG. 11. A di-block polymer may be used to provide a balance between crystallinity and cross-linking. For example, one block of the chain may be identical to virgin PEEK and assists in the formation of crystalline domains, whereas the other block with side chain amino groups can provide cross-links to other chains of the polymer.

In certain embodiments, other aromatic oligomers and polymers with end or side chain amino groups may be used as cross-linkers. For example, diamino-functionalized oligomers and polymers found in polyimide industry are readily adaptable for cross-linking PEEK or other polyketone polymers. Other examples are amine-functionalized high performance aromatic polymers such as poly(arylene oxide) (PPO), poly(arylene sulfide) (PPS), poly(arylene ether ketone) (PEK), poly(arylene ether sulfone) (PES), poly (benzazole) (PBX) type of rigid-rod polymers including poly(benzimidazole) (PBI), poly(benzoxazole) (PBO) and poly(benzothiazole) (PBT), poly(diimidazo pyridinylene dihydroxy phenylene) (PIPD, i.e. M5), poly(p-phenylene terephthalamide) (PPTA, i.e. KEVLAR™), thermotropic liquid crystalline polyesters, and etc. Mixtures of the above species may also be used. In this cross-linker system, PEEK-cross-linker interactions and thermal and chemical resistance of these cross-linkers may be selected to provide desired properties in the final cross-linked product. Such cross-linkers may be used alone or in combination with any one or more of the other cross-linkers disclosed herein.

In certain examples, a fiber, structural reinforcing component or a filler may include at least one amino group that can react with a polymer to provide a Schiff base linkage. In some examples, the fiber, reinforcing component or filler may include two or more amino groups that can be used to cross-link polymeric chains. In such instances, the core structure of the fiber, structural reinforcing component or filler represents the RX component of the generic $(P_1)_m$—N—$R_x$—N—$(P_2)_n$ formula. For example, when used as a structural material, PEEK is often compounded with reinforcing fibers or particles including carbon fibers, glass fibers, and silica particles. To incorporate cross-links into the composites, the fillers, reinforcing fibers or particles may be derivatized to include one, two or more amino groups and subsequently used as reinforcing crosslinkers. PEEK molecules can attach covalently to the fiber or particle surface via imine formation so that the PEEK chains are cross-linked to the filler. In addition, the filler can effectively transfer load exerted on the polymer so that it reinforces the PEEK material. Because of the covalent bonding at the interface, strong polymer-filler interfacial strength is likely to be achieved, which can provide favorable mechanical properties particularly in an oil field services environment.

Figure 12A:
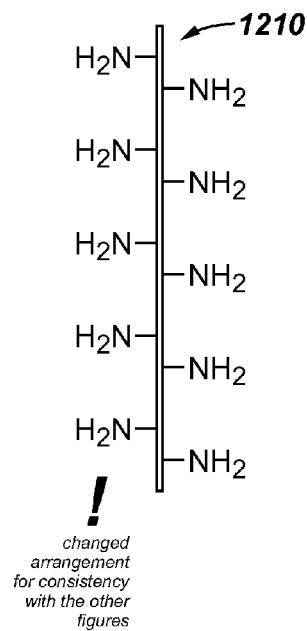
FIG. 12A is a schematic of a derivatized fiber including at least one amino group, according to one or more embodiments described.
Figure 12B:
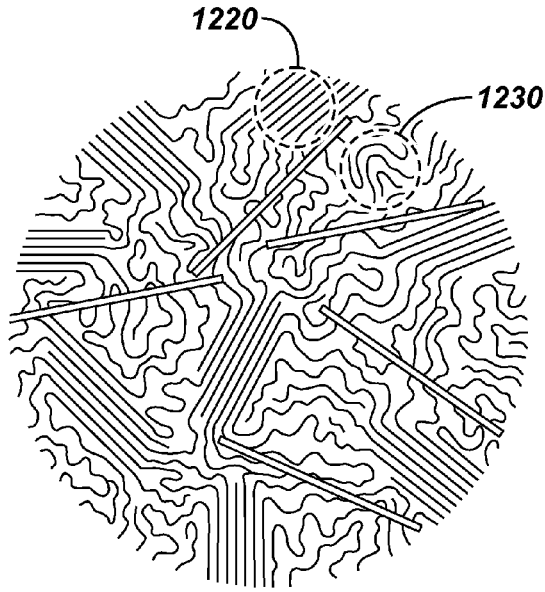
FIG. 12B is a drawing showing various domains of a polymer, according to one or more embodiments described.

FIG. 12A is a schematic of a derivatized fiber including at least one amino group and FIG. 12B is a drawing showing various domains of a polymer, according to one or more embodiments described. A schematic representation of PEEK reinforced with an amine-modified reinforcing fiber is shown in FIGS. 12A and 12B. The fiber 1210 includes two domains or regions—a region of high crystallinity 1220 and an amorphous region 1230. The presence of two domains may provide advantages for structural applications due to the co-existence of crystalline domains with reinforcing fibers covalently cross-linked/bounded to the amorphous domains. The amine-derivatized fibers or particles may be selected such that they have a boiling point of 300° C. or greater. The exact amount of derivatized particles and/or fillers used may vary depending on the desired properties of the resulting polymer. In certain examples, about 50 to about 100 parts per hundred (phr) of derivatized filler is combined with the polymer prior to cross-linking of the polymer.

In certain embodiments, the resulting high temperature elastomeric polymers produced using the cross-linkers disclosed herein may have an increased number of amorphous domains. In some examples, the total free volume within the high temperature elastomeric polymers can increase. Thus, more void space may be present within the high temperature elastomeric polymer network In certain examples, the high temperature elastomeric polymers disclosed herein may have a broader working temperature range than existing polymers used, for example, in down-hole applications in the oil field services industry. A desirable temperature range is about −50° C. to about 450° C. For example, when compared with virgin PEEK, the polymers may have a glass transition temperature, a melting temperature, and/or a β-transition temperature range that is broader than virgin PEEK. Such increased temperature ranges extend the lifetime of the polymers and can increase the number of potential applications of the polymers disclosed herein. Illustrative methods of determining glass transition temperatures are described, for example, in ASTM E1356-03. Methods for determining melting temperatures include, but are not limited to, calorimetry and differential scanning calorimetry. Methods for determining a β-transition temperature include, but are not limited to, dynamic mechanical thermal analysis (DMTA) and dynamic mechanical analysis (DMA).

In certain embodiments, a method including combining a polymer and at least one cross-linker having formulae (I)-(V) and a boiling point of 300° C. or more, and processing the combined polymer and cross-linker at a processing temperature to permit cross-linking of the polymer through formation of at least two Schiff base linkages between polymer chains of the polymer and the cross-linker is provided. The cross-linker may be any of the illustrative cross-linkers disclosed herein or other suitable cross-linkers falling within the scope of the generic formulae (II)-(V). In certain embodiments, the method may further comprise selecting the cross-linker as a derivatized PEEK including two terminal amino groups. In some examples, the method may further comprise selecting the cross-linker as a derivatized PEEK including two side chain amino groups. In other examples, the method may further comprise selecting the cross-linker as a derivatized fiber including at least two amino groups or as a derivatized particle including at least two amino groups. In some examples, the method may further comprise including configuring the polymer with at least two polyetheretherketone chains cross-linked through the at least two Schiff base linkages.

In certain embodiments, the high temperature elastomeric polymers disclosed herein may be prepared by combining one or more selected cross-linkers with one or more selected polymers. Several variables may affect the properties of the resulting high temperature elastomeric polymers including, but not limited to: mixing temperature and time, molding and annealing temperature, pressure and time, curing temperature and time and any post-cure annealing temperature, pressure and time that may occur.

In certain examples, the particular processing parameters may be selected based on the intended end use of the high temperature elastomeric polymers. For example, in structural applications, a high crystallinity grade polymer such as, for example, a high crystallinity grade PEEK, may be used as the high temperature elastomeric polymer. In some examples, the cross-linker reactivity is selected to be low enough so that there is no substantial cross-linking in the mixing stage, but is high enough so that the curing time is manageable within an industrial setting. The polymer, prior to cross-linking, may be annealed at a relatively low temperature (for example, about 200° C. to about 280° C.) and high load conditions so that crystallization can be completed before substantial cross-linking occurs. During this stage, the cross-linkers may segregate into the amorphous domains. It is also desirable to decrease curing time under a high curing temperature to minimize thermal degradation of the polymer.

In some examples, post-cure annealing may also be used to remove any defects caused in curing stage, and this annealing may be performed in a similar fashion as pre-cure annealing. For example, the annealing may occur during a solidification step through control of the cooling rate. In some examples, the annealing may be carried out inline during the extrusion step using a controlled cooling rate. Alternatively, the annealing step may be performed in a subsequent step after the polymer has been solidified and collected. In the latter case, the solidified polymer can be placed in an oven or transported through a heating zone for a period of time sufficient to affect crystallization. In some examples, the polymer may be annealed at a temperature from about 150° C. to about 350° C. or a temperature from about 200° C. to about 300° C., may be used in the annealing process.

In certain embodiments, the combination of a polymer and a cross-linker may be melt-processed or melt blended. In a typical melt blending operation, the polymer and the cross-linker are combined and heated until the polymer softens and/or melts and the cross-linker melts. The melted polymer may then react with the cross-linker to provide a resulting high temperature elastomeric polymer. Unlike many existing melt processes, which use temperatures of 250° C. or below, certain embodiments of the cross-linkers disclosed herein permit higher melt processing temperatures, such as those between about 250° C. and about 400° C. or even around 400° C. or greater.

In addition, by using cross-linkers having sterically hindered groups and/or high boiling points, a higher level of control for the cross-linking is provided, as substantially no cross-linking may occur prior to complete melting of the polymer. In some examples, cross-linking may not substantially occur at temperatures below about 300° C., whereas cross-linking may be promoted by exceeding about 300° C. Illustrative methods of melt processing and other processes for producing polymers may be found, for example, in Principles of Polymer Processing by Zehav Tadmor, 1979.

In some examples, the resulting high temperature elastomeric polymer may be cooled and/or shaped to provide a desired configuration. For example, the high temperature elastomeric polymer may be extruded, casted or introduced into a mold to provide a desired final shape. In some examples, the high temperature elastomeric polymer may take the form of a flat sheet film, a fiber, a hollow fiber or other desired article shape by melt extrusion, casting or molding.

In certain examples where the solubility of the cross-linker in the polymer is lower than desired, a phase transfer agent such as, for example, an alcohol, polyol or other desired agent may be added to increase the availability of the cross-linker for reaction with the polymer. Additional suitable phase transfer agents will be readily selected by the person of ordinary skill in the art, given the benefit of this disclosure.

In addition to the process controls, which can limit the degree of cross-linking, there are other variables that can affect the degree of cross-linking in the resulting polymer. For example, the grade of polymer (for example, semi-crystalline or amorphous PEEK) and their blends may affect the degree of cross-linking. In some examples, the solubility of the cross-linker in the polymer can affect the overall amount of cross-linking. In other examples, the particular groups selected for the cross-linker may affect the reactivity of the cross-linker. In other examples, the cross-linking density may affect the overall polymeric structure and/or properties.

In certain examples, removal of water during the cross-linking can favor Schiff base formation and/or disfavor hydrolysis of the Schiff base linkages. In embodiments where a derivatized filler, fiber or particle is used, the properties of the core structure can affect the degree of cross-linking and the properties of the resulting high temperature elastomeric polymer. It will be within the ability of the person of ordinary skill in the art, given the benefit of this disclosure to adjust or select these and other parameters to provide high temperature elastomeric polymers.

In some examples, the resulting high temperature elastomeric polymer may be subjected to one or more additional processing steps, prior to solidification, during solidification, and/or after solidification. For example, the high temperature elastomeric polymer may be calendered, coated, molded, cast, extruded, spin coated, brushed, painted or otherwise disposed on or in a desired surface of device for further processing.

In producing the high temperature elastomeric polymer, suitable devices such as, for example mixers, mills, grinders and the like may be used to mix and/or blend the various components used in the high temperature elastomeric polymer composition. For example, a HENSCHEL™ high speed mixer or other low shear devices including, hand mixing, mechanical stirring, magnetic stirring, etc., may be used to mix the polymer and the cross-linker.

In embodiments where an extruder is used, a polymer/cross-linker blend may be fed into the throat of an extruder via a hopper. Alternatively, one or more of the components may be incorporated into the composition by feeding directly into the extruder at the throat and/or downstream through a side port. Desired additives such as fillers, colorants and the like may also be compounded into a masterbatch and fed into the extruder. The extruder may be operated at a temperature higher than that necessary to cause the composition to melt or stay melted. The extrudate may be quenched in a water bath and pelletized. Such pellets may be used for subsequent molding, shaping, or forming.

In certain embodiments, one or more additional materials may be incorporated into the resulting cross-linked composition to provide, for example, desired physical traits and/or physical properties. For example, an impact modifier, may be used. Illustrative impact modifiers include, but are not limited to, those including one of elastomeric materials such as rubbers. For example, natural rubber, acrylic rubber, ASA rubber, diene rubber, organosiloxane rubber, ethylene propylene diene monomer (EPDM) rubber, styrene-butadiene-styrene (SBS) rubber, styrene-ethylene-butadiene-styrene (SEBS) rubber, acrylonitrile-butadiene-styrene (ABS) rubber, methacrylate-butadiene-styrene (MBS) rubber, styrene acrylonitrile copolymer and glycidyl ester impact modifiers may be used. In some examples, an elastomer or an elastomeric material may be added to the resulting polymer.

In certain embodiments, it may be desirable to include a radiation stabilizer in the resulting high temperature elastomeric polymer composition. Such radiation stabilizers may be useful, for example, where the part has an intended use environment where X-rays or gamma rays may be encountered such as, for example, in certain medical applications and in aerospace applications. Illustrative radiation stabilizers include, but are not limited to, diols, such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol and 1,4-hexanediol. In some examples, the radiation stabilizer may be an alicyclic alcohols such as 1,2-cyclopentanediol and 1,2-cyclohexanediol, a branched acyclic diols such as 2,3-dimethyl-2,3-butanediol (pinacol), and polyols, as well as an alkoxy-substituted cyclic or acyclic alkane. In other examples, an alkenol, with sites of unsaturation, may also be used, examples of which include 4-methyl-4-penten-2-ol, 3-methyl-pentene-3-ol, 2-methyl-4-penten-2-ol, 2,4-dimethyl-4-pene-2-ol, and 9-decen-1-ol. In additional examples, a tertiary alcohol having at least one hydroxy substituted tertiary carbon may be used. Examples of tertiary alcohols include, but are not limited to, 2-methyl-2,4-pentanediol(hexylene glycol), 2-phenyl-2-butanol, 3-hydroxy-3-methyl-2-butanone and 2-phenyl-2-butanol, and cycloaliphatic tertiary carbons such as 1-hydroxy-1-methyl-cyclohexane.

In yet other examples, a hydroxymethyl aromatic, which has a hydroxy substitution on a saturated carbon attached to an unsaturated carbon in an aromatic ring, may be used as a radiation stabilizer. The hydroxy substituted saturated carbon may be a methylol group (—$CH_2OH$) or it may be a member of a more complex hydrocarbon group. Specific hydroxy methyl aromatics include, but are not limited to, benzhydrol, 1,3-benzenedimethanol, benzyl alcohol, 4-benzyloxy benzyl alcohol and benzyl alcohol. Specific alcohols are 2-methyl-2,4-pentanediol (also known as hexylene glycol), polyethylene glycol, polypropylene glycol.

In certain embodiments, the sealing element produced using the high temperature elastomeric polymer may also include reinforcing wires, such as rebar. The seal element produced using the high temperature elastomeric polymer may also include conductive electrodes or cabling such that a current can be passed from one side of the sealing element to another side.

Certain specific examples are described in more detail below to further illustrate some of the novel and non-obvious features of the technology described herein.

Example 1

PEEK Properties

Table 2 shows the mechanical properties of virgin PEEK. PEEK loses mechanical properties significantly above glass transition temperature.

TABLE 2

| Mechanical properties of virgin PEEK | |
|---|---|
| Property | Value |
| Flexural Modulus (GPa) | |
| 23° C. | 3.7 |
| 100° C. | 3.6 |
| 200° C. | 0.5 |
| 200° C. | 0.3 |

TABLE 2-continued

Mechanical properties of virgin PEEK

| Property | Value |
|---|---|
| Tensile Strength (MPa) | |
| 23° C. | 92 |
| 100° C. | 50 |
| 200° C. | 12 |
| 200° C. | 10 |
| Elongation at Break (%) | 50 |
| Shear Strength (MPa) | 93 |
| Compressive Strength (MPa) | 120 |
| Izod Impact Strength (J/m) | |
| Unnotched | No break |
| Notched 0.25 mm rad | 83 |
| Cycles to Failure, at 23° C. | |
| 75 MPa | $10^7$ |
| 80 MPa | $10^3$ |
| 100 MPa | $10^2$ |
| 110 MPa | $10^1$ |

Figure 13:
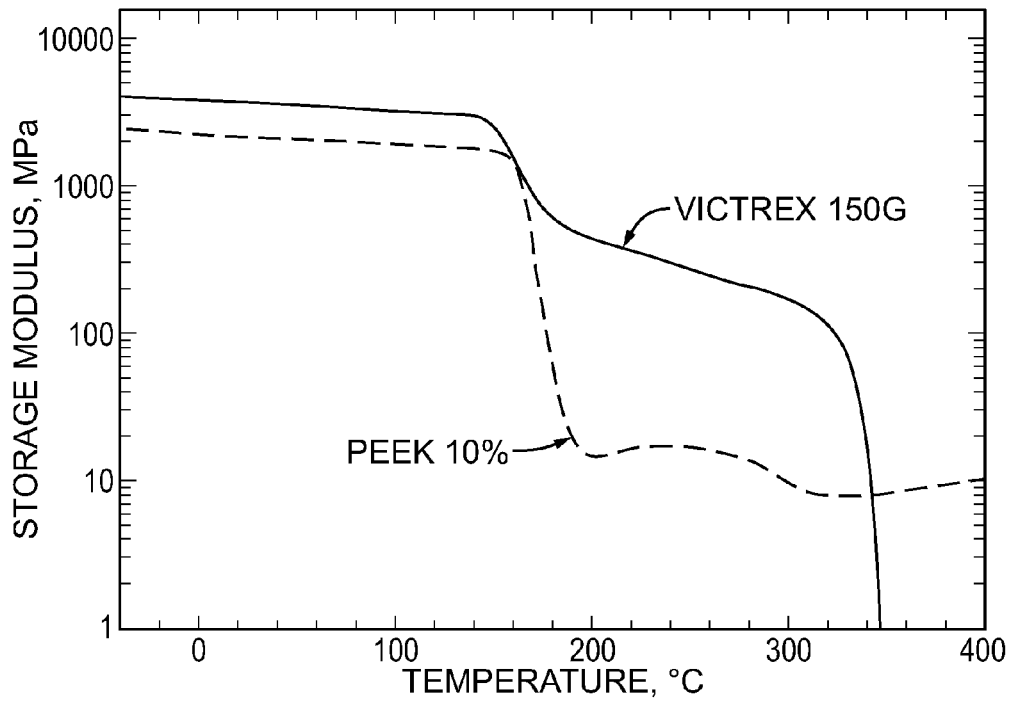
FIG. 13 is a graph showing the effect of cross-linking on polymer properties, according to one or more embodiments described.

Cross-linking of PEEK using the cross-linkers and methods described herein may be used to reduce the effect of temperature on PEEK properties. The storage modulus of virgin PEEK (VICTREX™ 150G) and cross-linked PEEK (10% carbonyl groups are cross-linked) is shown in FIG. 13.

The cross-linked PEEK was prepared as follows: 151G PEEK (from VICTREX™) 1,4-diphenylamine (from Alfa Aesar) and diphenyl sulfone (97%) (from Sigma-Aldrich) were used without purification. 10 grams of PEEK, 200 grams of diphenyl sulfone and 1.45 grams of 1,4,-diphenylamine were placed in a 500 mL three neck round bottom flask. The flask was placed under a continuous nitrogen purge. The mixture was then quickly heated to between about 300° C. and about 320° C. with vigorous stifling. When the temperature of the mixture reached 260° C., the nitrogen purge was discontinued. Because the boiling point of 1,4-phenylene diamine is 267° C., caution was taken not to purge the system extensively at temperatures above 260° C. to avoid the loss of the diamine cross-linking agent.

As soon as the PEEK material dissolved, the reaction mixture was cooled to 250-260° C. and maintained at this temperature for three hours with stirring. After every hour of reaction, the system was purged with nitrogen for a short period of time (10 minutes) to rid the system of the by-product water vapor. After three hours, the hot mixture was poured onto a glass dish, forming a solid. The solid was broken into small pieces, ground and placed into a round bottom flask with acetone and stirred overnight. In addition the mixture was sonicated for one hour to dissolve unreacted phenylene diamine and diphenyl sulfone.

Upon completion of the first extraction, the suspension in acetone was filtered on a vacuum filter. This purification procedure was repeated two more times, or to the point where the supernatant acetone solution exhibited no color and IR spectroscopy revealed an absence of diphenyl sulfone in the product. After purification the product was dried on a vacuum filter, and then heated in a vacuum oven at 100° C. overnight (or for about 6 to about 9 hours).

The resulting product was recovered quantitatively as greenish or yellowish powder. All modified PEEK polymer powders were hot-pressed by CARVER™ 4120 hydraulic press at 343° C. and post-cured at 250° C. for 4 hours. This procedure provided films approximately 0.3 mm-0.5 mm thick, from which specimens for tensile and exposure testing were cut out. The cross-linked PEEK shows a rubbery plateau over a much larger temperature range, and the storage modulus was virtually constant above 200° C.

A complementary method to reduce the temperature dependence of PEEK properties around $T_g$ is to compound PEEK with reinforcing fillers, although it is not the focus of the current embodiment. It has been well accepted that carbon fiber improves greatly the creep resistant of PEEK at elevated temperatures (around and above $T_g$).

Example 2

$T_g$ and β-Transition Temperature and Their Effects on Application Temperatures In an oilfield environment, it is expected that PEEK materials may be exposed to a broad temperature (including operational and non-operational temperatures), ranging from −50° C. to 450° C. depending on the geo-location or depth of the well. A desirable characteristic of the high temperature elastomeric polymers disclosed herein is that they possess a broad application temperature range.

The application temperature range of PEEK is dependent not only on glass transition (Tg) and melting temperatures but also the β-transition temperature. Melting temperature (Tm) of PEEK, around 334° C., is related to the size of crystalline domain. Larger crystals usually have a higher Tm. Since the variation in crystalline domain size is very limited in PEEK systems, only very small differences of PEEK melting points should be observed. Although Tm cannot be altered significantly, a variety of techniques may be used to control the crystallinity of PEEK, including annealing or quenching, and introducing chemical groups (such as —$SO_2$— groups or —$C(CH_3)_2$— groups) to the PEEK skeletal chain to inhibit crystallization, etc. By combining modifications in chemical structure and materials processing, crystallinity may be substantially removed, and semi-crystalline PEEK may be converted into an amorphous PEEK if desired.

Glass transition and β-transition temperatures can be varied to a larger extent. Glass transition of polymers is also called α-transition or α-relaxation, which is the primary relaxation mechanism of polymers. Above $T_g$ and below $T_m$ (for semi-crystalline material) or $T_f$ (flow temperature, for completely amorphous material), a glassy material becomes rubbery. The molecular origin of glass transition is commonly believed to be the large-scale segmental motion of polymers. The $T_g$ of PEEK is about 143° C., and the activation energy of glass transition of PEEK is about 1070-1900 kJ/mol (VICTREX™ 450G semi-crystalline and amorphous PEEK, DMA data, 0.1 Hz).

The sub-glass secondary relaxation is called β-transition or β-relaxation. The β-relaxation of PEEK is bi-modal, including a lower-temperature (β1) component, which originates from the local intra-chain motions in the bulk of the amorphous material, and a higher-temperature (β2) component, which originates from cooperative local chain alignment and arrangement in organized regions of the amorphous phase (i.e. at the crystal-amorphous inter-phase). The temperature range associated with β-relaxation is very broad, from −100° C. to about 50° C. Empirically, β-transition is believed to correlate with the toughness or ductility of polymers, and it is often called brittle-ductile transition for that reason. Below a certain temperature close to the lower bound of $T_β$ (around −65° C.), PEEK becomes brittle. PEEK is a tough polymer at room temperature, with elongation at break to be 50% (Table 2). This property is expected if it is assumed that the motions responsible for the β-relaxation are able to combine to yield longer range reorganization.

Example 3

Using the knowledge of glass transition and β-transition temperatures, the following methods may be used to modulate (mainly decrease) $T_g$ and $T_β$ so as to broaden the application temperature range of PEEK.

Functional plasticizers may be added to the cross-linked PEEK before cross-linking. Such functional plasticizers may be small aromatic molecules, which may have a structure similar to the cross-linkers disclosed herein without any amino groups. In some examples, the plasticizer may be oligomers or short chains of PEEK itself. In other examples, nano-particles such as, for example, clay, silica, carbon black, carbon nanotubes, polysilsesquioxane (POSS), etc, and their organic derivatives (e.g., organic molecule modified nano-particles), may be used as plasticizers.

In other examples, the transition temperatures of the PEEK may be modified by performing structural modifications to the PEEK molecule. For example, if a lower glass transition temperature is desired, the molecular weight of the PEEK may be decreased. In some examples, a PEEK with a flexible backbone may be used when lower $T_g$ and $T_β$ are desired. A flexible pendant group may be attached to the PEEK to lower the $T_g$ and $T_β$. Illustrative pendant groups include, but are not limited to, —OCF3, —OCF2CF3, and —O-phenyl. In other examples, the cross-linking density of PEEK may be decreased to provide a lower $T_g$. In certain examples, the PEEK chain may be branched to decrease $T_g$ and $T_β$.

Figure 14:
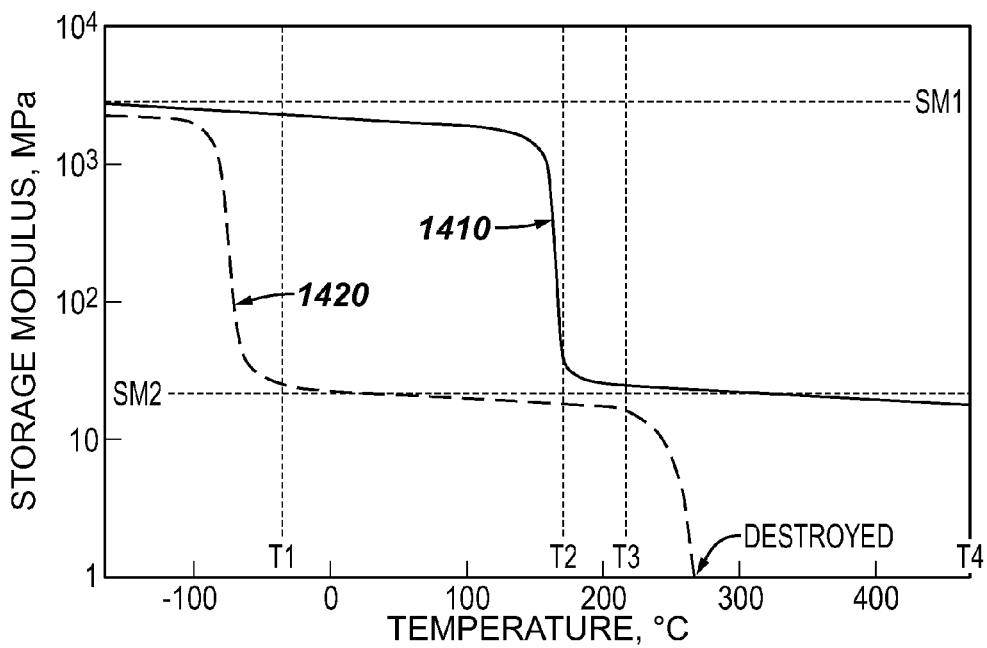
FIG. 14 depicts a graphical representation of the storage modulus the packer element, according to one or more embodiments described.

FIG. 14 depicts a graphical comparison between the temperature characteristics of the high temperature elastomeric polymer and an elastomer, according to one or more embodiments. The high temperature elastomeric polymer 1410 has a first storage modulus greater than or equal to about 1,000 MPa at a temperature between about −100° C. and about 150° C. The storage modulus of the high temperature elastomeric polymer 1410 drops by about 2 to about 3 orders of magnitude between a temperature of about 150° C. to about 170° C. The storage modulus of the high temperature elastomeric polymer 1410 ranges from about 10 MPa to about 200 MPa at a temperature of between about 170° C. and about 450° C. In contrast, the elastomer 1420 declines from a first storage modulus greater than or equal to about 1,400 MPa to a storage modulus of about 50 MPa between a temperature of about −100° C. and a temperature of about 85° C. In contrast, the high temperature elastomeric polymer 1410 may not substantially degrade at temperatures below about 400° C. Accordingly, the high temperature elastomeric polymer 1410 has an operating temperature that is at least 50° C. higher than the operating temperature of the elastomer 1420.

Figure 15:
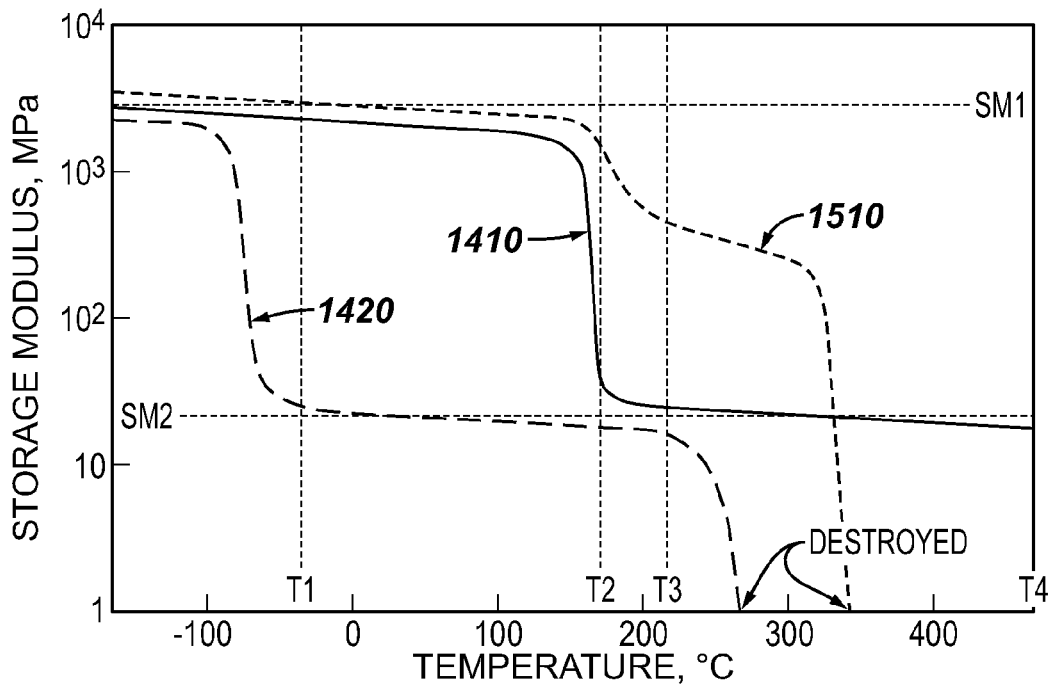
FIG. 15 depicts a graphical representation of the effects on the storage modulus of the packer element when the glass transition temperature is lowered, according to one or more embodiments described.

FIG. 15 depicts a graphical comparison between the temperature characteristics of the high temperature elastomeric polymer 1410, the elastomer 1420, and a non-elastomeric polymer 1510, according to one or more embodiments. The high temperature elastomeric polymer 1410 and the elastomer 1420 perform as discussed in FIG. 14.

The non-elastomeric polymer 1510 has a storage modulus that is greater than the elastomeric polymer 1410 at a temperature from about −100° C. to a temperature of about 300° C. At a temperature of about 200° C. the storage modulus of the non-elastomeric polymer begins a rapid decline and the non-elastomeric polymer 1510 is completely destroyed at a temperature of about 350° C. Accordingly, the high temperature elastomeric polymer 1410 has an operating temperature at least 50° C. larger than the non-elastomeric polymer 1510. In addition, the non-elastomeric polymer maintains a relatively high storage modulus from a temperature of −100° C. to a temperature of about 300° C. The high storage modulus maintained by the non-elastomeric polymer makes the non-elastomeric polymer 1510 unsuitable as a sealing element on a packer.

Figure 16:
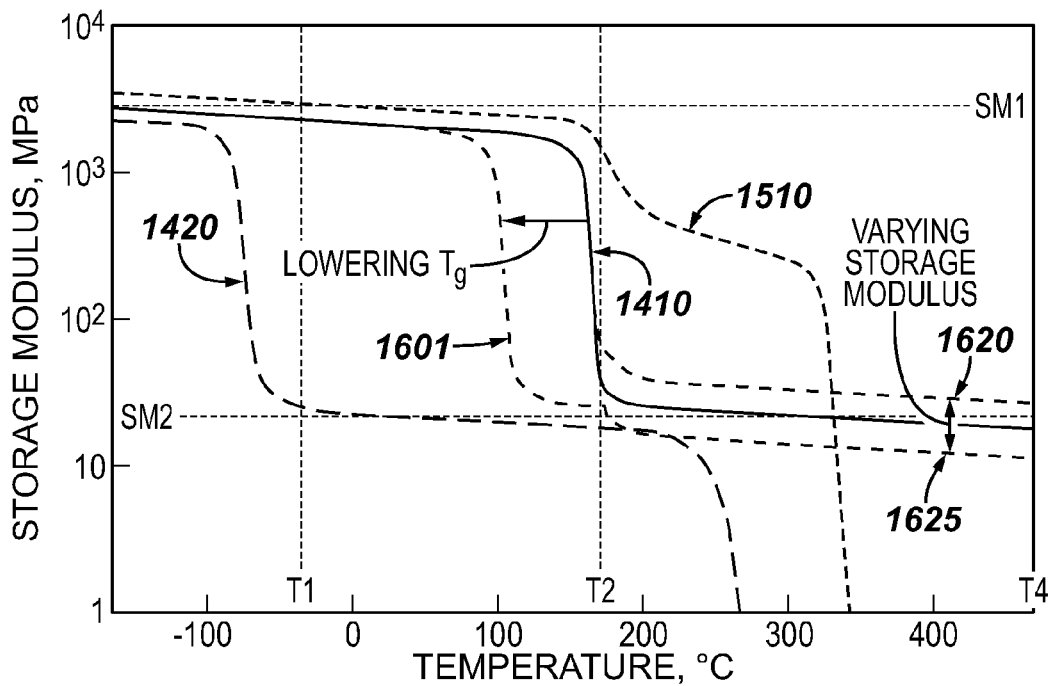
FIG. 16 depicts a graphical representation of the temperature and mechanical characteristics of the packer element, including exemplary ranges of glass transition temperatures and storage moduli, according to one or more embodiments described.

FIG. 16 depicts a graphical comparison of the temperature and mechanical characteristics of the high temperature elastomeric polymer 1410, the elastomer 1420, the non-elastomeric polymer 1510, and a high temperature elastomeric polymer having a reduced glass transition temperature ("$T_g$") 1601, according to one or more embodiments. The high temperature elastomeric polymer 1410, the elastomeric polymer 1420, and the non-elastomeric polymer 1510 performed as discussed above in FIGS. 14 and 15. FIG. 16 further depicts the ranges of glass transition temperatures and the storage modulus of the rubbery plateau that can be achieved in one or more embodiments.

The high temperature elastomeric polymer having a reduced $T_g$ 1601 has a storage modulus that is substantially equal to the storage modulus of the high temperature elastomeric polymer 1410 from a temperature from about −100° C. to a temperature of about 100° C. However, the storage modulus of the high temperature elastomeric polymer having a reduced $T_g$ 1601 starts to decline at about 100° C. The storage modulus of the high temperature elastomeric polymer having a reduced $T_g$ 1601 is about 30 MPa at a temperature of about 150° C. and stays between about 30 MPa to about 10 MPa from 150° C. to about 450° C.

The $T_g$ of the high temperature elastomeric polymer can be lowered by adding impurities such as plasticizers, limiting the amount of cross link of the polymer, such as PEEK, and decreasing the crystallinity. The $T_g$ of the high temperature of the elastomeric polymer can be increased by increasing the amount of crosslinks, increasing the crystallinity of the material, and/or by adding fillers such as carbon black, silica, CNT, and carbon fibers. The storage modulus of the elastomeric polymer can be varied by varying the ratio of filler. The storage modulus of the high temperature elastomeric material at a temperature of about 400° C. can be varied from a maximum 1620 of about 100 MPa to a minimum 1625 of about 1 MPa by varying the amount of plasticizers, crosslinking density, and the filler content.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Figure 17:
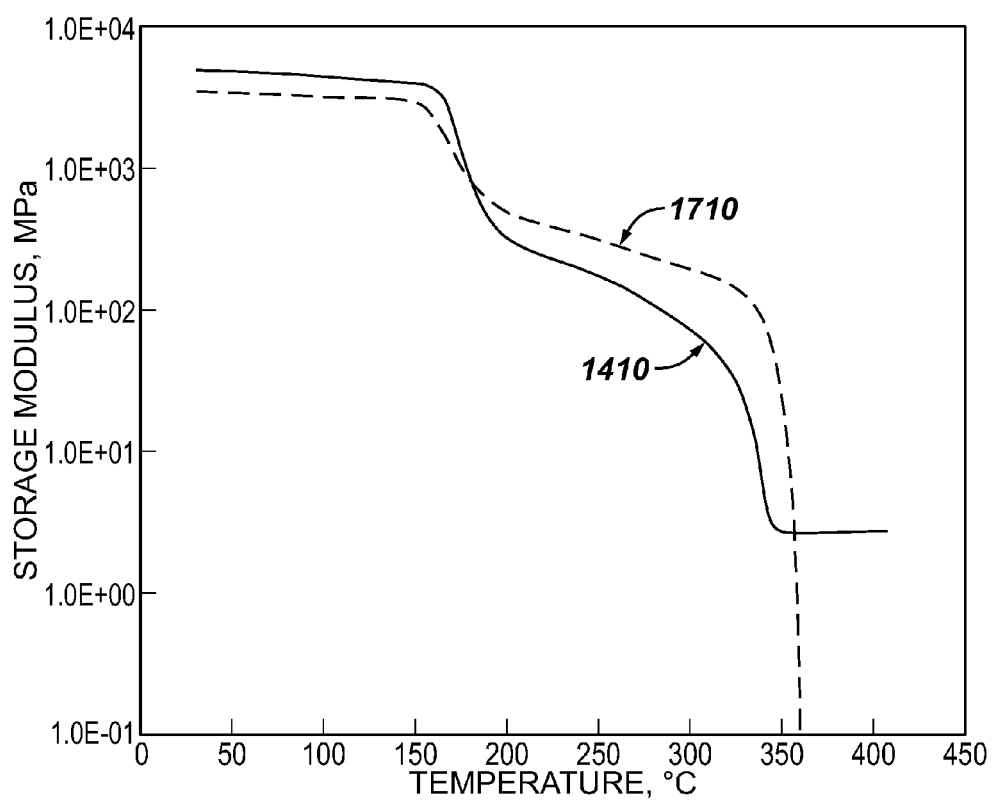
FIG. 17 depicts a graphical representation of the storage modulus as a function of temperature of two exemplary packer compositions, according to one or more embodiments described.

FIG. 17 depicts another graphical comparison of the temperature and mechanical characteristics of the high temperature elastomeric polymer 1410 and another elastomer 1710, which may be, for example, PEEK 151G. As shown, the high temperature elastomeric polymer 1410 has a storage modulus that is approximately equivalent to elastomer 1710 from about 20° C. to about 350° C. However, at about 330° C., the elastomer 1710 begins to melt, and may yield, thus a packer made of the elastomer 1710 may fail at temperatures above approximately 330° C., even under minimal load conditions. In contrast, the storage modulus of the high temperature elastomeric material 1410 remains between about 1 MPa and about 1000 MPa, between about 1 MPa and about 10 MPa, or for example, about 5 MPa, and thus may remain intact at temperatures above 330° C. As noted above, however, some degradation of even the high temperature elastomeric material 1410 may occur at temperatures approaching 400° C. However, above 330° C., elastomer 1710, which may be conventional PEEK, melts while the high temperature elastomeric material 1410 remains mechanically sound.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method of sealing an annulus of a wellbore comprising:
    conveying a downhole packer into a wellbore at a temperature less than or equal to a first temperature, wherein the downhole packer comprises:
        a tubular member having a ring slidably positioned on an outer surface thereof, a stop fixedly attached to the outer surface, and an annular seal element mounted around the tubular member between the stop and the ring, wherein the annular seal element comprises an elastomeric polymer having a first storage modulus at the first temperature and a second storage modulus at a second temperature;
    exposing the annular seal element to a wellbore temperature greater than or equal to the second temperature; and
    setting the annular seal element, wherein the annular seal element comprises at least partially cross-linked polyetheretherketone.

2. The method of claim 1, wherein the first temperature is between about −100° C. and about 170° C.

3. The method of claim 1, wherein the first storage modulus is between about 1,000 MPa and about 10,000 MPa.

4. The method of claim 1, wherein the second temperature is between about 50° C. and about 450° C.

5. The method of claim 1, wherein the second modulus is between about 1 MPa and about 1,000 MPa.

6. The method of claim 1, wherein the annular seal element is rigid at or below the first temperature, and compliantly deformable at or above the second temperature.

7. The method of claim 1, wherein the ring is adapted to slide in an axial direction relative to the tubular member.

* * * * *